(12) United States Patent
Liu (10) Patent No.: US 12,392,706 B1
(45) Date of Patent: Aug. 19, 2025

(54) SEALED PRESSURE CONTAINER FOR HIGH-PRESSURE ACCELERATED AGING TEST

(71) Applicant: HAITUO INSTRUMENT (JIANGSU) CO., LTD., Suzhou (CN)

(72) Inventor: Dongxi Liu, Suzhou (CN)

(73) Assignee: HAITUO INSTRUMENT (JIANGSU) CO., LTD., Suzhou (CN)

( * ) Notice: Subject to any disclaimer, the term of this patent is extended or adjusted under 35 U.S.C. 154(b) by 0 days.

(21) Appl. No.: 19/202,563

(22) Filed: May 8, 2025

Related U.S. Application Data (63) Continuation of application No. PCT/CN2023/107219, filed on Jul. 13, 2023.

(30) Foreign Application Priority Data

Jan. 12, 2023 (CN) .......................... 202310040508.3

(51) Int. Cl.
*G01N 17/00* (2006.01)

(52) U.S. Cl.
CPC .................................. *G01N 17/002* (2013.01)

(58) Field of Classification Search
CPC .............................. G01N 17/002; G01N 17/00
USPC ................................................. 73/865.6, 866
See application file for complete search history.

(56) References Cited

U.S. PATENT DOCUMENTS

| | | | |
|---|---|---|---|
| 2005/0247603 A1 | 11/2005 | DeCenso et al. | |
| 2011/0309850 A1 | 12/2011 | Yoshida et al. | |

FOREIGN PATENT DOCUMENTS

| | | | | |
|---|---|---|---|---|
| CN | 201575143 U | 9/2010 | | |
| CN | 101949254 A | 1/2011 | | |
| CN | 209278275 U | 8/2019 | | |
| CN | 210533891 U | 5/2020 | | |
| CN | 210571189 U | 5/2020 | | |
| CN | 111337199 A | 6/2020 | | |
| CN | 111805454 A | 10/2020 | | |
| CN | 112892618 A | 6/2021 | | |
| CN | 113092238 A | 7/2021 | | |
| CN | 213986127 U | 8/2021 | | |
| CN | 113945793 A | 1/2022 | | |
| CN | 114813530 A | * | 7/2022 | ............. G01N 17/00 |
| CN | 217059868 U | * | 7/2022 | |
| CN | 218067585 U | 12/2022 | | |
| CN | 116047205 A | 5/2023 | | |

(Continued)

*Primary Examiner* — Laura Martin
*Assistant Examiner* — Nashmiya S Fayyaz
(74) *Attorney, Agent, or Firm* — SZDC Law PC (57) ABSTRACT

The invention provides a sealed pressure vessel including a box body, a pressure chamber and a humidification device. The pressure chamber includes a chamber body, a chamber door and a sealing mechanism. The sealing mechanism includes a first seal ring, a second seal ring, a seal chain and a driving assembly. A length of the seal chain is less than a circumference of the first seal ring. The seal chain includes a plurality of clamping members and first connecting members. Two ends of the first connecting member are rotatably connected to adjacent clamping members. A groove is opened on a side surface of the clamping member. A width of the groove opening is greater than a sum of thicknesses of the first and second seal ring, and a width of the groove bottom is less than the sum of the thicknesses of the first and second seal ring.

10 Claims, 4 Drawing Sheets

(56) References Cited

FOREIGN PATENT DOCUMENTS

| | | | |
|---|---:|---|---:|
| DE | 7019681 | U | 9/1970 |
| GB | 2182992 | A | 5/1987 |
| KR | 20070083747 | A | 8/2007 |
| KR | 100977808 | B1 | 8/2010 |
| KR | 20180107403 | A | 10/2018 |
| WO | 9619692 | A1 | 6/1996 |

* cited by examiner

SEALED PRESSURE CONTAINER FOR HIGH-PRESSURE ACCELERATED AGING TEST

This application is a Continuation Application of PCT/CN2023/107219, filed on Jul. 13, 2023, which claims priority to Chinese Patent Application No. CN 202310040508.3, filed on Jan. 12, 2023, which is incorporated by reference for all purposes as if fully set forth herein.

FIELD OF THE INVENTION

The present invention relates to a sealed pressure vessel for a high-pressure accelerated aging test, applicable to the technical field of electronic device aging test.

DESCRIPTION OF THE RELATED ART

With the booming development of 5G communications, semiconductor chips, aerospace technology, and other high-precision and cutting-edge technology industries, the importance of precision electronic components widely used in such industries is also becoming increasingly apparent. To control the quality of various types of electronic device products, the products usually need to undergo aging tests before leaving the factory. At present, a conventional aging test method is usually carried out by using a highly accelerated aging test apparatus. The principle of the apparatus is to increase water vapor pressure to a certain extent to simulate a high-pressure, high-temperature, high-humidity test environment, and increase environmental stress in a pressure chamber to accelerate product aging to assess the reliability of electronic components. Because a high-pressure environment needs to be simulated for the test method, the pressure chamber of the test apparatus needs to have sufficient sealing performance. In most pressure chambers of existing highly accelerated aging test apparatuses, a chamber door and a chamber body are locked by a latch to achieve sealing. However, the sealing effect of this sealing method is related to the number of latches. If only a small number of latches are arranged, when the pressure in the pressure chamber is excessively high, leakage tends to occur, or the chamber door may even burst open, causing a safety accident. If a large number of latches are arranged, the latches need to be locked or unlocked one by one during operation, making the sealing operation complex, time-consuming, and laborious. In addition, to ensure the sealing effect, a sealing tape is usually arranged between the chamber door and the chamber body of the pressure chamber, and the sealing effect depends on the volume of the sealing tape to a certain extent. Movable components of the latches press the strip in a locking process, making it convenient to pull locking rings to lock the locking rings to fixed components of the latches. When the volume of the sealing tape is large, the locking process of the latches are laborious, leading to increased operational difficulty.

SUMMARY OF THE INVENTION

To resolve the foregoing defects in the prior art, the present invention provides a sealed pressure vessel for a high-pressure accelerated aging test.

The technical solution adopted in the present invention is as follows: A sealed pressure vessel for a high-pressure accelerated aging test includes a box body, a pressure chamber provided in the box body, and a humidification device provided in the box body and configured to supply water vapor to the pressure chamber to provide pressure and humidity. The pressure chamber includes a chamber body configured to accommodate a product under test, a chamber door provided at an opening of the chamber body in a relatively openable or closable manner, and a sealing mechanism provided in the box body and configured to perform sealing when the chamber door is closed relative to the chamber body. The sealing mechanism includes a first seal ring provided on an outer wall at the opening of the chamber body in a circumferential direction and protruding outward, a second seal ring provided along a sidewall of the chamber door and abutting against the first seal ring when the chamber door is closed relative to the chamber body, a seal chain provided around a periphery of the first seal ring and configured to tighten to clamp the first seal ring and the second seal ring when the first seal ring abuts against the second seal ring, and a driving assembly connected to two ends of the seal chain respectively and configured to tighten or loosen the seal chain. A length of the seal chain is less than circumferences of the first seal ring and/or the second seal ring, the seal chain includes a plurality of clamping members and a plurality of first connecting members provided at intervals with the plurality of clamping members, two ends of each of the first connecting members are respectively rotatably connected to two adjacent clamping members, a groove is opened in a side surface of each of the clamping members that faces the first seal ring, a width of the groove gradually decreases from a groove opening to a groove bottom, a width of the groove opening of the groove is greater than a sum of thicknesses of the first seal ring and the second seal ring, and a width of the groove bottom of the groove is less than the sum of the thicknesses of the first seal ring and the second seal ring. The pressure chamber has a sealed state and an open state. When the pressure chamber is in the sealed state, the chamber door is closed at the opening of the chamber body, and the first seal ring abuts against the second seal ring. In this case, the driving assembly pulls the two ends of the seal chain to enable the seal chain to be wound around the first seal ring and the second seal ring and tightened, so that the plurality of clamping members clamp the first seal ring and the second seal ring in the grooves opened in the clamping members, and inner walls with gradually decreasing spacings in the grooves clamp the first seal ring and the second seal ring to achieve sealing. When the pressure chamber is in the open state, the driving assembly is driven reversely to enable the seal chain to loosen and release from the first seal ring and the second seal ring, thereby facilitating the separation of the first seal ring from the second seal ring to open the chamber door relative to the chamber body.

Preferably, the driving assembly includes a first driving block and a second driving block that are respectively rotatably connected to the two ends of the seal chain by a second connecting member, a screw rod provided on a lateral side of the first seal ring in a direction perpendicular to an axis of the chamber body, and a driving motor having an output shaft connected to the screw rod and configured to drive the screw rod to rotate, a first thread and a second thread having a thread hand opposite to that of the first thread are provided on the screw rod, and the first driving block and the second driving block are respectively thread-connected to the screw rod by the first thread and the second thread. When the driving motor drives the screw rod to rotate in a forward direction, the first driving block and the second driving block may approach each other along the first thread and the second thread having opposite thread hands, and drive the two ends of the seal chain to tighten the seal chain, thereby achieving sealing. When the driving motor drives the screw rod to rotate in a reverse direction, the first driving block and the second driving block may move away from each other, thereby making the seal chain loosen and release from the first seal ring and the second seal ring.

Preferably, the pressure vessel further includes a box door slidably connected to the box body, a sliding groove is provided in an inner wall of the box body in a front-rear direction, the box door is slidably connected to the sliding groove by a sliding rail provided at an edge of the box door in the front-rear direction, and the chamber door is inserted in a rear wall of the box door. When the pressure chamber is in the open state, the pressure chamber is opened by drawing the box door, thereby improving operational convenience.

Preferably, the pressure chamber further includes a test carrier board configured to load a product under test, and the test carrier board is fixedly connected to a rear wall of the chamber door. When the pressure chamber is opened by drawing the box door, the test carrier board may be drawn out along, thereby facilitating the installation and removal of a device under test, and facilitating the detection of a test status of the device under test.

Preferably, an annular sealing gasket is provided on a side surface of the second seal ring that is opposite to the first seal ring in a circumferential direction of the side surface, so that the sealing effect can be further improved.

Preferably, the humidification device includes a humidification barrel, a first heating device provided in the humidification barrel and configured to heat water to generate water vapor, and an air inlet pipe having two ends respectively connected to the chamber body and the humidification barrel and configured to feed water vapor into the chamber body, one end of the air inlet pipe is connected to an upper portion of the humidification barrel, and the other end of the air inlet pipe is connected to an upper central portion of the chamber body. Water in the humidification barrel may be heated by the first heating device, and generated water vapor is fed into the pressure chamber through the air inlet pipe, thereby facilitating the simulation of a high-pressure, high-temperature, high-humidity test environment.

More Preferably, the humidification device further includes a water tank and a water return pipe configured to return condensed water generated in the chamber body to the water tank, one end of the water return pipe is in fluid communication with the water tank, and the other end of the water return pipe is connected to a bottom of the chamber body, which facilitates the recycling of condensed water, thereby reducing energy consumption.

Preferably, the pressure chamber further includes a second heating device provided in the chamber body and configured to heat air in the chamber body, which facilitates the heating of the environment in the pressure chamber by using the second heating device, thereby improving the controllability of test parameters such as pressure, temperature, and humidity in the pressure chamber.

Due to the use of the foregoing technical solutions, the present invention has the following advantages over the related art.

For the sealed pressure vessel for a high-pressure accelerated aging test of the present invention, the pressure chamber is sealed by using the seal chain provided around the chamber body to ensure that the chamber door and the chamber body can be multi-directionally clamped when the chamber door is closed on the chamber body, thereby improving the sealing effect, preventing leakage and explosion, and avoiding safety accidents. In addition, the seal chain is tightened and loosened by using the driving assembly, so that manual operations of a person are reduced, time and labor are saved, and the operational difficulty is reduced.

BRIEF DESCRIPTION OF THE DRAWINGS

Some specific embodiments of the present invention are described below in detail in an exemplary rather than limiting manner with reference to the accompanying drawings. Identical reference numerals in the accompanying drawings label the same or similar components or parts. It should be understood by those skilled in the art that these accompanying drawings are not necessarily drawn to scale. In the accompanying drawings.

REFERENCE NUMERALS 1. box body; 11. box door; 12. sliding groove; 13. sliding rail; 2. pressure chamber; 21. chamber body; 22. chamber door; 23. test carrier board; 24. sealing gasket; 3. sealing mechanism; 31. first seal ring; 32. second seal ring; 33. seal chain; 331. clamping member; 332. first connecting member; 333. groove; 334. second connecting member; 34. driving assembly; 341. first driving block; 342. second driving block; 343. screw rod; 344. driving motor; 345. first thread; 346. second thread; 4. humidification device; 41. humidification barrel; 42. first heating device; 43. air inlet pipe; 44. water return pipe; 45. water tank; and 46. second heating device.

DETAILED DESCRIPTION OF THE PREFERRED EMBODIMENTS

The following clearly and completely describes the technical solutions in the present invention with reference to the accompanying drawings. Apparently, the embodiments described below are some embodiments of the present invention rather than all the embodiments. All other embodiments obtained by persons of ordinary skill in the art based on the embodiments of the present invention without creative efforts fall within the protection scope of the present invention.

In the description of the present invention, it needs to be noted that the terms "front" and "rear" in relation to orientation are defined according to the structural orientation of the pressure vessel, specifically, the side of the pressure vessel on which the doors are located is "front", and the opposite side is "rear"; the terms "first" and "second" are used only for description, but are not intended to indicate or imply relative importance. In addition, the technical features involved in different embodiments of the present invention described below can be combined with each other as long as they do not constitute a conflict between them.

Referring to FIG. 1 to FIG. 5, this embodiment provides a sealed pressure vessel for a high-pressure accelerated aging test, which includes a box body 1, a pressure chamber 2 provided in the box body 1, and a humidification device 4 provided in the box body 1 and configured to supply water vapor to the pressure chamber 2 to provide pressure and humidity.

The pressure chamber 2 includes a chamber body 21 configured to accommodate a product under test, a chamber door 22 provided at an opening of the chamber body 21 in a relatively opened or closed manner, and a sealing mechanism 3 provided in the box body 1 and configured to perform sealing when the chamber door 22 is closed relative to the chamber body 21. The sealing mechanism 3 includes a first seal ring 31 provided on an outer wall at the opening of the chamber body 21 in a circumferential direction and protruding outward, a second seal ring 32 provided along a sidewall of the chamber door 22 and abutting against the first seal ring 31 when the chamber door 22 is closed relative to the chamber body 21, a seal chain 33 provided around a periphery of the first seal ring 31 and configured to tighten to clamp the first seal ring 31 and the second seal ring 32 when the first seal ring 31 abuts against the second seal ring 32, and a driving assembly 34 connected to two ends of the seal chain 33 respectively and configured to tighten or loosen the seal chain. A length of the seal chain 33 is less than the circumference of the first seal ring 31 and/or the second seal ring 32, the seal chain 33 includes a plurality of clamping members 331 and a plurality of first connecting members 332 provided at intervals with the plurality of clamping members 331, and two ends of each of the first connecting members 332 are respectively rotatably connected to two adjacent clamping members 331.

Figure 1:
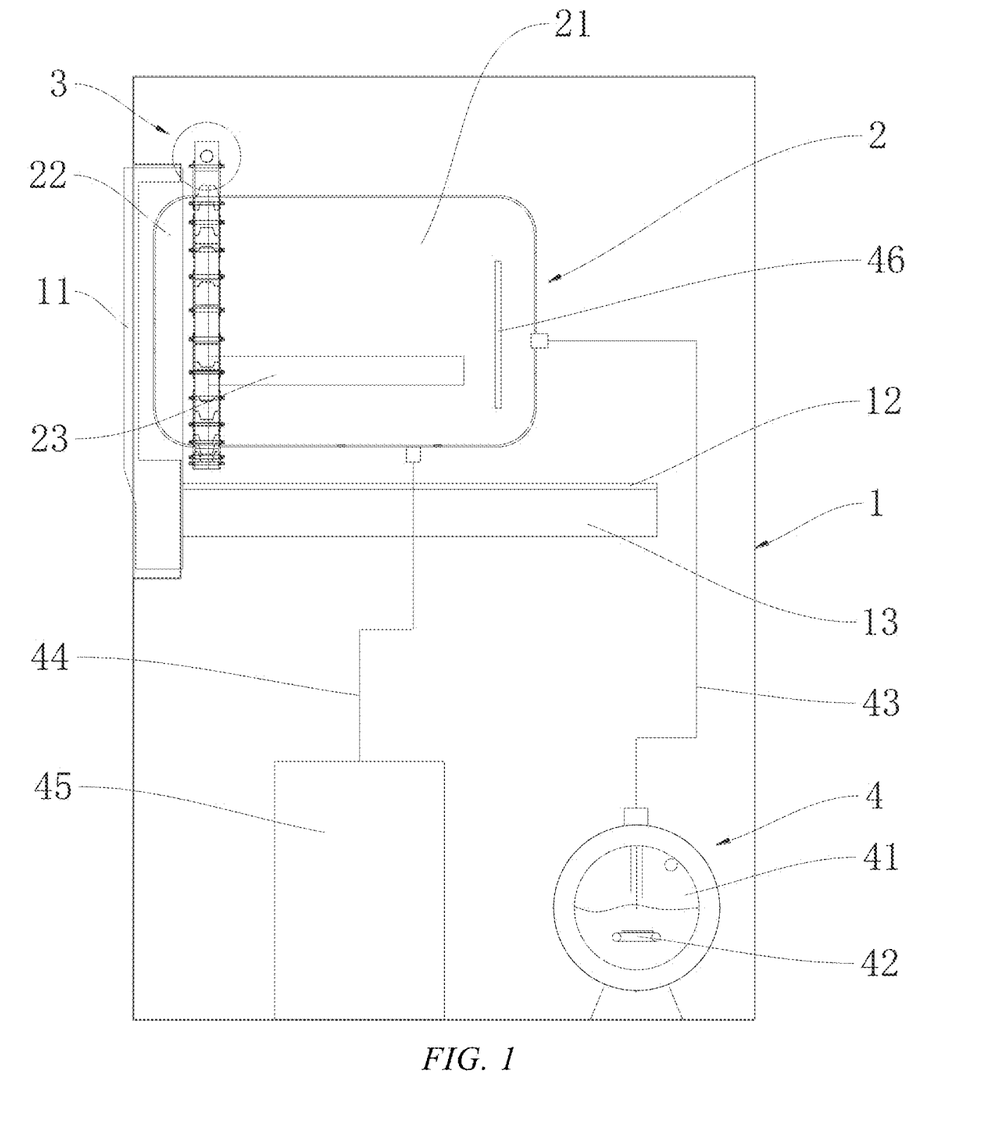
FIG. 1 is a schematic structural diagram 1 according to an embodiment of the present invention.
Figure 2:
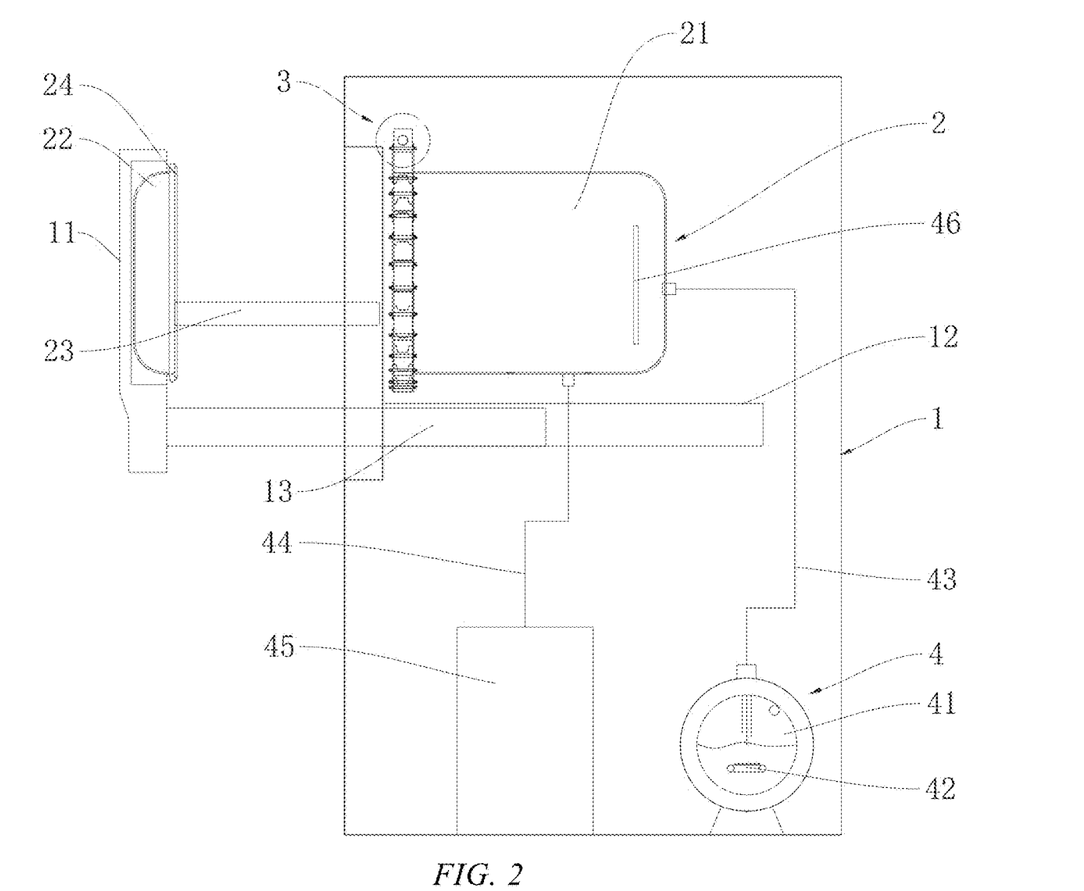
FIG. 2 is a schematic structural diagram 2 of the embodiment shown in FIG. 1.
Figure 3:
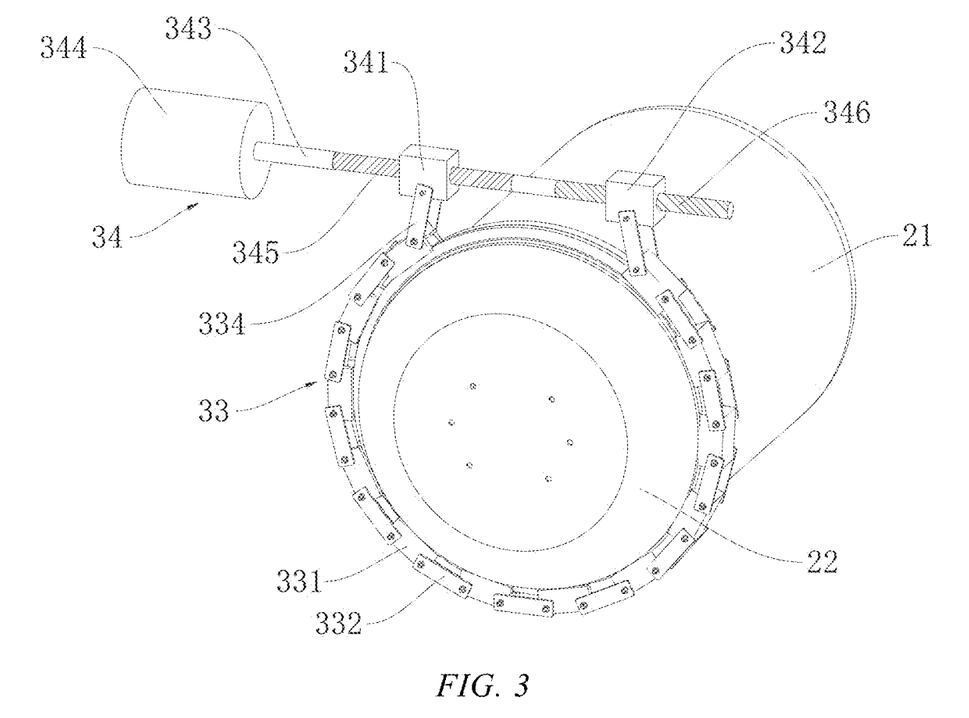
FIG. 3 is a schematic structural diagram 1 of a pressure chamber in the embodiment shown in FIG. 1.
Figure 4:
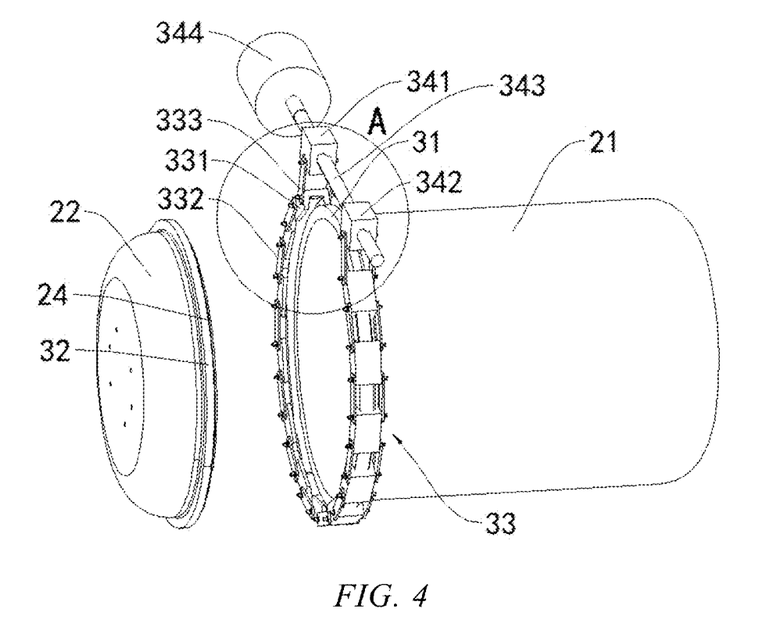
FIG. 4 is a schematic structural diagram 2 of a pressure chamber in the embodiment shown in FIG. 1.
Figure 5:
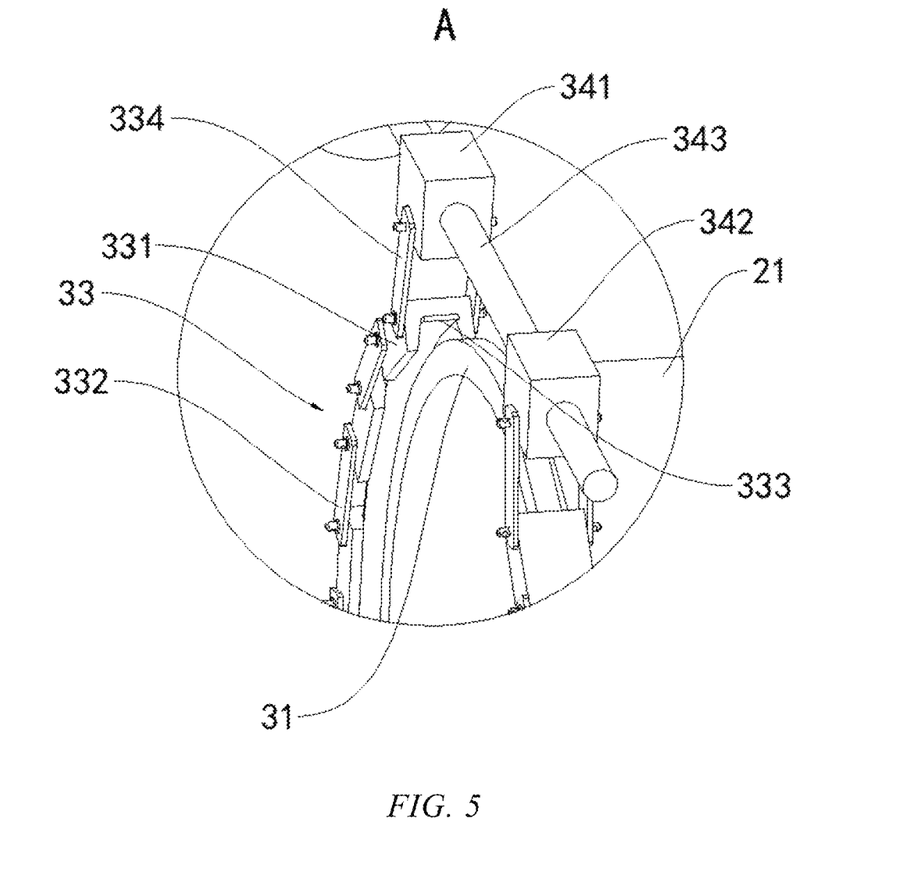
FIG. 5 is an enlarged view of a part A in FIG. 4.

A groove 333 is opened on a side surface of each of the clamping members 331 that faces the first seal ring 31, as shown in FIG. 4 and FIG. 5, a width of the groove 333 gradually decreases from a groove opening to a groove bottom, a width of the groove opening of the groove 333 is greater than a sum of thicknesses of the first seal ring 31 and the second seal ring 32, and a width of the groove bottom of the groove 333 is less than the sum of the thicknesses of the first seal ring 31 and the second seal ring 32. The pressure chamber 2 has a sealed state and an open state. When the pressure chamber 2 is in the sealed state, the chamber door 22 is closed at the opening of the chamber body 21, and the first seal ring 31 abuts against the second seal ring 32. In this case, the driving assembly 34 pulls the two ends of the seal chain 33 to enable the seal chain 33 to be wound around the first seal ring 31 and the second seal ring 32 and tightened, so that the plurality of clamping members 331 clamp the first seal ring 31 and the second seal ring 32 in the grooves 333 opened on the clamping members 331, and inner walls with gradually decreasing spacings in the grooves 333 clamp the first seal ring 31 and the second seal ring 32 to achieve sealing. When the pressure chamber 2 is in the open state, the driving assembly 34 is driven reversely to enable the seal chain 33 to loosen and release from the first seal ring 31 and the second seal ring 32, the first seal ring 31 is separated from the second seal ring 32, the chamber door 22 is opened relative to the chamber body 21.

In a preferred implementation, the driving assembly 34 includes a first driving block 341, a second driving block 342, a screw rod 343 provided on a lateral side of the first seal ring 31 in a direction perpendicular to an axis of the chamber body 21, and a driving motor 344 having an output shaft connected to the screw rod 343 and configured to drive the screw rod 343 to rotate. A second connecting member 334 is rotatably provided at each of the two ends of the seal chain 33, and two second connecting member 334 are respectively rotatably connected to the first driving block 341 and the second driving block 342. A first thread 345 and a second thread 346 having a thread hand opposite to that of the first thread 345 are provided on the screw rod 343, and the first driving block 341 and the second driving block 342 are respectively in threaded connection with the screw rod 343 by the first thread 345 and the second thread 346.

When the driving motor 344 drives the screw rod 343 to rotate in a forward direction, the first driving block 341 and the second driving block 342 may approach each other along the first thread 345 and the second thread 346 having opposite thread hands, and drive the two ends of the seal chain 33 to tighten the seal chain 33, thereby achieving sealing. When the driving motor 344 drives the screw rod 343 to rotate in a reverse direction, the first driving block 341 and the second driving block 342 may move away from each other, thereby making the seal chain 33 loosen and release from the first seal ring 31 and the second seal ring 32. By the second connecting member 334

In a preferred implementation, the pressure vessel further includes a box door 11 slidably connected to the box body 1, a sliding groove 12 is provided on an inner wall of the box body 1 in a front-rear direction, the box door 11 is slidably connected to the sliding groove 12 by a sliding rail 13 provided at an edge of the box door 11 in the front-rear direction, and the chamber door 22 is inserted in a rear wall of the box door 11. When the pressure chamber 2 is in the open state, the pressure chamber 2 is opened by drawing the box door 11, thereby improving operational convenience.

In a preferred implementation, the pressure chamber 2 further includes a test carrier board 23 configured to load a product under test, and the test carrier board 23 is fixedly connected to a rear wall of the chamber door 22. When the pressure chamber 2 is opened by drawing the box door 11, the test carrier board 23 may be drawn out along, thereby facilitating the installation and disassembly of a device under test, and facilitating the detection of a test status of the device under test.

In a preferred implementation, an annular sealing gasket 24 is provided on a side surface of the second seal ring 32 that is opposite to the first seal ring 31 in a circumferential direction of the side surface, so that the sealing effect can be further improved.

In a preferred implementation, the humidification device 4 includes a humidification barrel 41, a first heating device 42 provided in the humidification barrel 41 and configured to heat water to generate water vapor, and an air inlet pipe 43 having two ends respectively connected to the chamber body 21 and the humidification barrel 41 and configured to feed water vapor into the chamber body 21, one end of the air inlet pipe 43 is connected to an upper portion of the humidification barrel 41, and the other end of the air inlet pipe 43 is connected to an upper central portion of the chamber body 21. Water in the humidification barrel 41 may be heated by the first heating device 42, and the generated water vapor is fed into the pressure chamber 2 through the air inlet pipe 43, thereby facilitating the simulation of a high-pressure, high-temperature, high-humidity test environment.

In a preferred implementation, the humidification device 4 further includes a water tank 45 and a water return pipe 44 configured to return condensed water generated in the chamber body 21 to the water tank 45, one end of the water return pipe 44 is in fluid communication with the water tank 45, and the other end of the water return pipe 44 is connected to a bottom of the chamber body 21, which facilitates the recycling of condensed water, thereby reducing energy consumption.

In a preferred implementation, the pressure chamber 2 further includes a second heating device 46 provided in the chamber body 21 and configured to heat air in the chamber body 21, which facilitates the heating of the environment in the pressure chamber 2 by using the second heating device 46, thereby improving the controllability of test parameters such as pressure, temperature, and humidity in the pressure chamber 2.

Due to the use of the foregoing technical solutions, the present invention has the following advantages over the related art.

For the sealed pressure vessel for a high-pressure accelerated aging test of the present invention, the pressure chamber is sealed by using the seal chain provided around the chamber body to ensure that the chamber door and the chamber body can be multi-directionally clamped when the chamber door is closed on the chamber body, thereby improving the sealing effect, preventing leakage and explosion, and avoiding safety accidents. In addition, the seal chain is tightened and loosened by using the driving assembly, so that manual operations of a person are reduced, time and labor are saved, and the operational difficulty is reduced.

The foregoing embodiments are only used to describe the technical concept and characteristics of the present invention, and are intended to enable a person skilled in the art to understand the content of the present invention and achieve implementation, but shall not be used to limit the protection scope of the present invention. Any equivalent variations or modifications made according to the spirit and essence of the present invention shall fall within the protection scope of the present invention.

What is claimed is:

1. A sealed pressure vessel for a high-pressure accelerated aging test, comprising:
   a box body (1);
   a pressure chamber (2), wherein the pressure chamber (2) is provided in the box body (1), and the pressure chamber (2) comprises a chamber body (21) configured to accommodate a product under test and a chamber door (22) provided at an opening of the chamber body (21) in a relatively opened or closed manner;
   a humidification device (4), wherein the humidification device (4) is provided in the box body (1) and is configured to supply water vapor to the pressure chamber (2) to provide pressure and humidity; and
   a sealing mechanism (3), wherein the sealing mechanism (3) is provided in the box body (1) and is configured to perform sealing when the chamber door (22) is closed relative to the chamber body (21), the sealing mechanism (3) comprises a first seal ring (31) protruding outward around the opening of the chamber body (21) and formed on an outer wall of the chamber body (21), a second seal ring (32) provided along an edge of the chamber door (22), a seal chain (33) provided around a periphery of the first seal ring (31), and a driving assembly (34) connected to two ends of the seal chain (33) respectively and configured to tighten or loosen the seal chain (33), and when the chamber door (22) is closed relative to the chamber body (21), the first seal ring (31) abuts against the second seal ring (32), and the seal chain (33) tightens to clamp the first seal ring (31) and the second seal ring (32), wherein
   a length of the seal chain (33) is less than the circumference of the first seal ring (31) and/or the second seal ring (32), the seal chain (33) comprises a plurality of clamping members (331) and a plurality of first connecting members (332) provided at intervals with the plurality of clamping members (331), two ends of each of the first connecting members (332) are respectively rotatably connected to two adjacent clamping members (331), a groove (333) is opened on a side surface of each of the clamping members (331) that faces the first seal ring (31), a width of the groove (333) gradually decreases from a groove opening to a groove bottom, a width of the groove opening of the groove (333) is greater than a sum of thicknesses of the first seal ring (31) and the second seal ring (32), and a width of the groove bottom of the groove (333) is less than the sum of the thicknesses of the first seal ring (31) and the second seal ring (32).

2. The sealed pressure vessel for a high-pressure accelerated aging test according to claim 1, wherein the driving assembly (34) comprises a first driving block (341) and a second driving block (342) that are respectively rotatably connected to the two ends of the seal chain (33), a screw rod (343) provided in a direction perpendicular to an axis of the chamber body (21), and a driving motor (344) configured to drive the screw rod (343) to rotate, a first thread (345) and a second thread (346) having a thread hand opposite to that of the first thread (345) are provided on the screw rod (343), the first driving block (341) is in threaded engagement connection with the first thread (345), and the second driving block (342) is in threaded engagement connection with the second thread (346).

3. The sealed pressure vessel for a high-pressure accelerated aging test according to claim 2, wherein a second connecting member (334) is rotatably provided at each of the two ends of the seal chain (33), and the first driving block (341) and the second driving block (342) are connected to the two ends of the seal chain (33) by a pair of second connecting members (334).

4. The sealed pressure vessel for a high-pressure accelerated aging test according to claim 1, wherein the pressure chamber further comprises a box door (11), a sliding rail (13) is provided at an edge of the box door (11), and the sliding rail (13) is in sliding fit with a sliding groove (12) provided in an inner wall of the box body (1) in a front-rear direction.

5. The sealed pressure vessel for a high-pressure accelerated aging test according to claim 4, wherein the chamber door (22) is inserted in a rear wall of the box door (11).

6. The sealed pressure vessel for a high-pressure accelerated aging test according to claim 1, wherein the pressure chamber (2) further comprises a test carrier board (23) configured to load a product under test, and the test carrier board (23) is fixedly connected to the chamber door (22).

7. The sealed pressure vessel for a high-pressure accelerated aging test according to claim 1, wherein an annular sealing gasket (24) is provided on a side surface of the second seal ring (32) that is opposite to the first seal ring (31) in a circumferential direction of the side surface.

8. The sealed pressure vessel for a high-pressure accelerated aging test according to claim 1, wherein the humidification device (4) comprises humidification barrel (41), a first heating device (42) provided in the humidification barrel (41) and configured to heat water to generate water vapor, and an air inlet pipe (43) having two ends respectively connected to the chamber body (21) and the humidification barrel (41) and configured to feed water vapor into the chamber body (21), one end of the air inlet pipe (43) is connected to an upper portion of the humidification barrel (41), and the other end of the air inlet pipe (43) is connected to an upper central portion of the chamber body (21).

9. The sealed pressure vessel for a high-pressure accelerated aging test according to claim 8, wherein the humidification device (4) further comprises a water tank (45) and a water return pipe (44) configured to return condensed water generated in the chamber body (21) to the water tank (45), one end of the water return pipe (44) is in fluid communication with the water tank (45), and the other end of the water return pipe (44) is connected to a bottom of the chamber body (21).

10. The sealed pressure vessel for a high-pressure accelerated aging test according to claim 1, wherein the pressure chamber (2) further comprises a second heating device (46) provided in the chamber body (21) and configured to heat air in the chamber body (21).

* * * * *